March 1, 1938.  A. KINDELMANN  2,109,538

CAMERA AND MAGAZINE THEREFOR

Filed July 7, 1934  2 Sheets-Sheet 1

INVENTOR
ALBERT KINDELMANN.
BY
ATTORNEYS

March 1, 1938.　　　A. KINDELMANN　　　2,109,538
CAMERA AND MAGAZINE THEREFOR
Filed July 7, 1934　　　2 Sheets-Sheet 2
Fig-3-
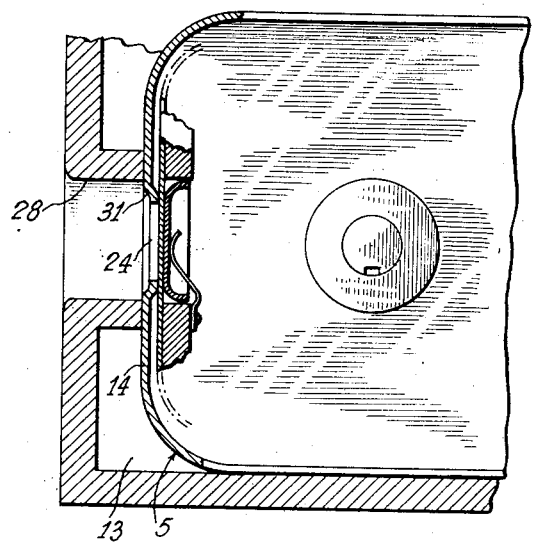
Fig-4-
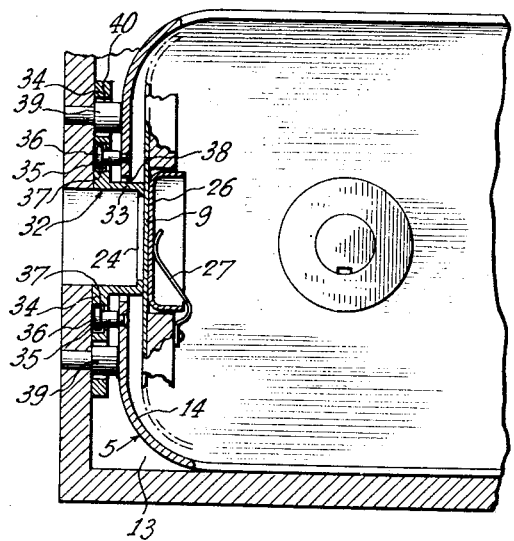
INVENTOR
ALBERT KINDELMANN.
BY
ATTORNEYS Patented Mar. 1, 1938

2,109,538

UNITED STATES PATENT OFFICE 2,109,538

CAMERA AND MAGAZINE THEREFOR

Albert Kindelmann, Floral Park, N. Y., assignor to International Projector Corporation, New York, N. Y., a corporation of Delaware Application July 7, 1934, Serial No. 734,142

7 Claims. (Cl. 88—17)

This invention relates to motion picture cameras and film magazines therefor, and more particularly relates to a film magazine including a device for framing the film in the zone where it is exposed and for holding it in proper focal relation to the lens of the camera.

In constructing a film magazine for motion picture cameras a number of varied and, in a sense, conflicting requirements have to be considered and satisfied. For one thing, in order to enable the exposure of a film so that all of the individual pictures have the same size and the right focus, it is important that an accurately shaped and positioned aperture be provided for admitting light to the film. Then, too, the film should lie flat against the rear face of the aperture. In addition, the aperture and cooperating elements are to be constructed so that light striking the film section under exposure, will not penetrate into the magazine to affect other film sections. On the other hand, it is important that the construction shall permit the film to be fed past the aperture without binding. Moreover, the magazine has to be extremely simple to construct and should be as compact as possible. In addition, the magazine should be light-tight and capable of being inserted in the camera without the need for any special precautions on the part of the person using the camera, especially in the case of cameras adapted for use by amateurs.

Considering these difficulties as well as manufacturing tolerances and the demand for accuracy without excessive cost of the magazines, certain persons have adopted an expedient involving the use of an aperture plate rigidly mounted on the camera, so that it extends into a window or aperture in the magazine to engage the film. However, this scheme has certain disadvantages.

The present invention aims to satisfy the above-mentioned requirements and avoids the disadvantages by providing a superior construction which requires relatively few, uncomplicated parts.

More particularly, a feature of the invention resides in providing a magazine construction in which a film engaging aperture plate is carried by the magazine and in some cases is movable with respect to the main body of the magazine. This permits the magazine to engage a fixed stop member provided on the camera without having the film interposed between a fixed part of the camera on the one hand and a part of the magazine on the other hand, thus avoiding the possibility of binding the film if the magazine does not fit fairly in the camera or if the magazine is pressed too hard against parts in the camera. Stated another way, the present invention provides that the film will be guided solely by parts carried by or within the magazine so that its movement is substantially or completely unaffected by the fit or pressure of the magazine in the camera.

Another feature of the present invention resides in providing an improved film magazine including an aperture, for the purposes indicated, which is not only simple and inexpensive to manufacture but also effective in use.

A further feature lies in providing a construction of this character in which the member forming the aperture is seated against a portion of the camera but in such a way as to leave the film substantially unaffected by the engagement of the magazine with parts in the camera, and in which the film is urged to lie flat and without the possibility of binding between the rear face of the aperture member and associated film guiding members carried by the magazine.

A more detailed feature is the provision of an aperture of the type indicated which is capable of some relative, bodily movement with respect to the main body of the magazine casing and which is held stationary when the magazine is in the camera.

Other features, objects and advantages will in part become apparent and in part be pointed out in connection with the following detailed description of exemplary forms of the invention, reference being had to the accompanying drawings wherein:

Fig. 3 is a similar view of another modified embodiment in which the aperture plate is formed as a part of the magazine casing; and Fig. 4 is a similar view of another modified form in which the aperture plate is formed independently of the magazine casing but carried thereby as in Fig. 1.

Figure 1:
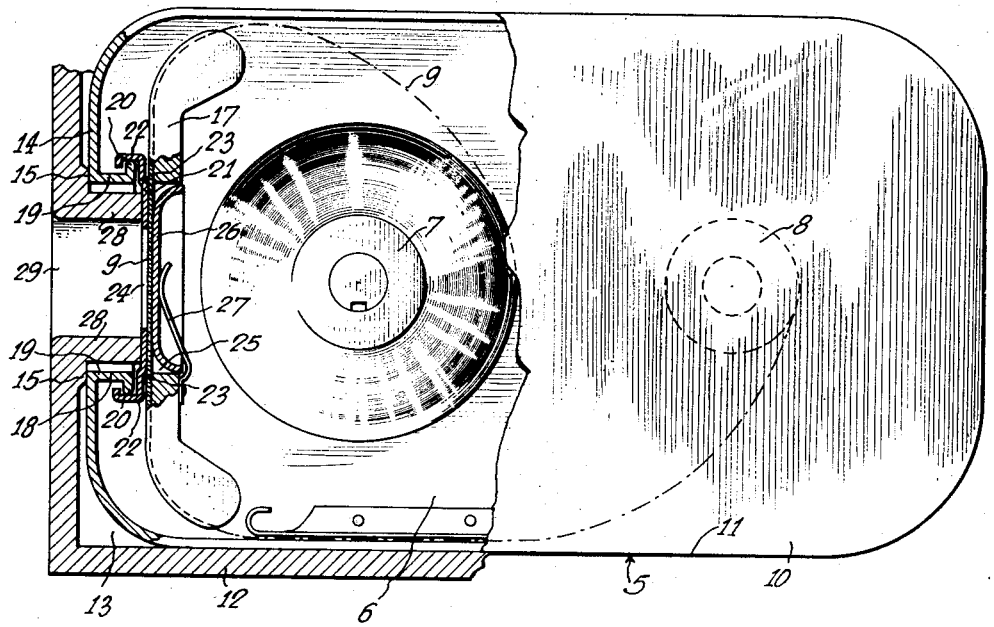
Fig. 1 is a side elevation, partly in section, of one form of magazine in accordance with the invention, a portion of a cooperating camera being shown.

With reference first to Fig. 1, a magazine casing 5 is provided forming an enclosure 6 for film take-off spool 7, take-up spool 8, and film 9. Wall 10 of the casing may be formed as a removable cover for assembly purposes. The casing may be formed of any suitable material, preferably light sheet metal, and may take any convenient shape, preferably being provided with a side edge wall 11 adapted to seat on the lower wall 12 of a magazine compartment 13 formed in in the camera. The enclosing walls of compartment 13 may be arranged to closely fit about the magazine so that when the latter is slid into the compartment it fits snugly therein. The forward edge wall 14 of the magazine may abut against rearwardly projecting shoulders 15 formed on the front end or edge wall of the compartment 13, and may be held thereagainst by a rear door (not shown) on the camera. Yielding means, such as a flat spring (not shown), attached at one end to the rear wall of the magazine, may be provided, when desired, for urging the magazine against the front wall of compartment 13 when the compartment door is closed.

Within the magazine there is advantageously provided a gate plate 17 which may be fastened to a wall of the casing 5 in any suitable fashion. This plate serves to guide the film past a window formed in the front wall of the casing for admitting light to the film. The window 18 may lie between inwardly projecting arms 19 formed on or secured to the front wall 14 of the casing, and having upwardly and downwardly projecting feet or flanges 20, which are preferably of sufficient extent, width-wise of the magazine, to support and vertically align an aperture plate 21 having U-shaped end portions 22 adapted to receive the feet. These U-shaped portions 22 preferably extend the full width of the magazine in order to bear against the side walls thereof for laterally aligning the aperture and preferably enable some forward and rearward movement of the plate 21 with respect to the casing 5.

The plate 21 is provided with a central, precisely formed aperture 24 which controls the light striking the film section lying immediately rearward of and in abutment with this plate. The U-shaped end portions of the aperture plate may be offset forwardly of the central portion of the plate, as indicated at 23. An opening 25 may advantageously be so formed in the gate plate 17 that the end portions 22 do not wedge the film against the gate, or in other words, so that the central, rearward portion of the aperture plate is aligned with and slightly smaller than the opening 25.

Slidably mounted in the opening 25 there is preferably provided a presser member 26 which is constantly urged forwardly against the film by means of a spring 27 or other yielding device which may be secured to the gate-plate. In order to hold the aperture plate 22 in proper relation to the camera lens (not shown), the camera may be provided with a box-shaped portion or extensions 28 for bearing against the front of the aperture plate at two or more sides of the aperture 24, an opening 29 being thus formed sufficiently large to avoid interfering with full light reaching the aperture 24.

Toward one or both sides of the magazine, the aperture plate 21 and camera wall may be formed with openings, or may be broken away, in order to enable intermittent mechanism, such as a pin and claw, to engage sprocket holes in the film and thus draw it forward. Or the intermittent mechanism may engage the film above or below the aperture plate 21. Suitable connections may be attached to spool 8 for enabling the camera to wind the film when the magazine is in the camera. Other details of these portions of the construction will not be described as it will be understood that they may take any convenient form; for instance, they may be constructed in accordance with familiar practice.

As to the operation and certain advantages of the form of magazine and camera described, it will be understood from the foregoing that before the magazine is placed in the camera, it is rendered light-tight by reason of film being held against the aperture plate 21, which may then assume its foremost position. When the magazine is placed in the camera compartment 13, the front wall of the magazine abuts against shoulders 15 of the camera, and there is thus provided a rigid stop for the magazine. The portions 19 of the magazine, lying at angles to the front wall 14, serve to reenforce the magazine and prevent the front wall from being deformed should the magazine be pushed into place with more force than is required to seat it. At the same time the aperture plate 21 may yield and thus move slightly rearwardly, to the position shown, upon abutment with the portion 28 of the camera which serves as a stop for definitely locating the aperture plate with respect to the lens (not shown) which is mounted on the camera. The presser member 26, which is larger than the aperture 24 in vertical extent, urges the film section which is immediately rearward of the aperture plate 21 into engagement therewith. On the other hand, the film immediately above and below the gate does not bind between the gate member 17 and the aperture plate. In this manner the film section in the zone for exposure is held flat and at proper distance from the camera lens, while the free running of the film is not interfered with. A corollary advantage is that emulsion is not scraped off the film. Moreover, the magazine is adequately light-tight, so that light does not reach the film preceding and following the section under exposure.

In the construction shown in Fig. 1, and also in the form shown in Fig. 4, it will be appreciated that the aperture plate while maintained vertical is "full floating", or, in other words, is not engaged by any spring means, except through the action of the presser plate 26. Accordingly, when the term "full floating" is used herein it intends an aperture plate of this type, which is particularly advantageous in the respects above noted.

Figure 2:
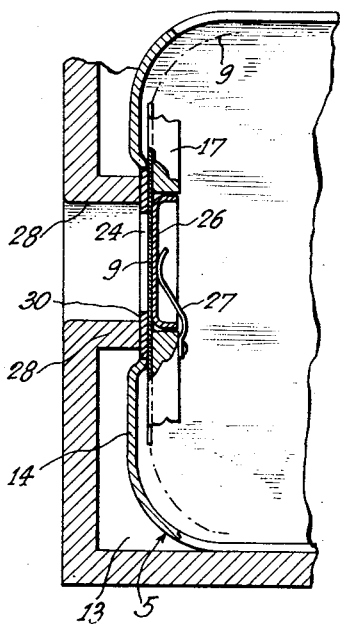
Fig. 2 is a similar view of a modified embodiment in which the aperture plate is formed as a part of the magazine casing.

In the modified form of construction shown in Fig. 2, the front wall 14 of the magazine casing 5 is formed with a recess or depression within which is disposed the rearwardly offset portion of limited film-contact area which may be termed the aperture plate 30 provided with the aperture 24. The aperture plate is rigidly secured to the casing wall but in some instances may be formed as a different member or of different material. A pressure plate 26 and a resilient pressing means 27 therefor may be provided in an opening in the gate-plate 17 as in the previous form. In this form also, it will be observed that the film is not engaged between camera and magazine parts but solely by parts carried by the magazine and the danger of binding the film so as to prevent its free movement is avoided, regardless of the fit or pressure of engagement of the magazine in the camera.

The form shown in Fig. 3 differs from the form shown in Fig. 2 in that the front wall 14 of the magazine, within the space between the abutting portions 28 of the camera, is provided with an offset film-engaging portion 31 carrying the aperture 24. In this form the portion 31, which may be termed the aperture plate, is of less extent than in the Fig. 2 form and the portion 28 of the camera does not necessarily engage within a recessed portion of the magazine casing. The movement of the film in the Fig. 3 form is independent of the relative fit and engaging pressure between magazine and camera parts, just as in the other forms.

In the embodiment shown in Figs. 2 and 3 the magazine casing may have some resiliency to permit the aperture plate to adjust itself to the end of the portion 28 of the camera but the casing takes the entire engaging pressure between the magazine and the camera to avoid binding the film; and in no case is the casing deformed sufficiently to cause a binding action on the film against the gate-plate. In the Fig. 3 form particularly, due to the fact that the offset portion or aperture plate 31 falls within the limits of the opening of the gate-plate, the danger of binding is very remote. The amount of deformation of the front wall of the magazine in the forms shown in Figs. 2 and 3, will of course depend upon the character or extent of engagement between the magazine and the portion 28 carried by the camera. If the portion 28 of the camera is formed as a closed tube slightly larger than the aperture 24 so as to lie completely between the top and bottom walls of the magazine, the deformation of the front wall of the magazine will be greater than if the portions 28 are merely formed as bars which extend completely across the front end of the magazine.

In Fig. 4 there is shown a form of camera and magazine construction which is somewhat more complicated to manufacture than the preceding forms, but which has certain compensating advantages. In this form, the aperture plate 32 may be formed with a box-shaped or tubular portion 33 having flanges 34 adapted to bear against the front wall of the camera compartment 13. The aperture 24 may be formed in the rear wall of the box-shaped portion 33 and is preferably slightly smaller than the opening in the box-shaped portion. In order to support the aperture plate 32 upon the magazine casing 5, two or more studs 35 may be riveted or otherwise suitably secured to the front wall 14 of the casing. The aperture plate is slidably mounted on the studs which may have heads 36 lying in recesses 37 formed in the aperture plate. The recesses 37 are preferably somewhat larger than the heads 36 on the studs, so as not to interfere with forward and rearward movement of the aperture plate with respect to the casing. The casing is provided with an opening 38 in the front wall thereof to enable the box-shaped portion 33 to extend into the casing and abut against the film 9. In order to provide a rigid abutment for the front wall of the casing, the camera housing may have secured in the front wall thereof one or more pins 39, which may extend through openings 40, larger than the pins and formed in the aperture plate flanges 34.

It will thus be appreciated that the aperture plate 32 is carried by the casing and functions in many respects similarly to the plate shown in Fig. 1. That is to say, the aperture plate 32 is enabled to move forwardly and rearwardly with respect to the casing 5, and is positively located with respect to the camera lens when the magazine is placed in the camera. At the same time, the aperture plate 32 is substantially located in a vertical plane by means of its sliding engagement with the pins 35. As described in connection with other forms, the presser plate 26 is resiliently urged against the film 9 by yielding means 27, and thus maintains the film in abutment with the rear face of the aperture plate.

Through the present invention there is provided an aperture plate construction which is carried wholly by the magazine itself and which in some forms, at least is capable of being automatically and precisely aligned with and spaced from the lens of the camera when the magazine is inserted in the compartment in the camera. Moreover, through the movable or flexible connections of the character described, the aperture plate can be positively held in a definite, vertical plane when the magazine is in operative position. In addition, the film may be properly guided through the gate and rearward of the aperture plate without binding. The construction is particularly simple to manufacture and effective in operation. Furthermore, the seating of the magazine in proper position in the compartment is insured without the need for complicated devices on the camera and without danger of binding the film due to the fact that all film guiding parts are carried by the magazine.

While certain novel features of the invention have been disclosed and are pointed out in the annexed claims, it will be understood that various omissions, substitutions and changes may be made by those skilled in the art without departing from the spirit of the invention.

What is claimed is:

1. In a motion picture camera, in combination, a compartment for the camera adapted to receive a magazine, said compartment including a front wall, a self-contained fully enclosed unitary film magazine comprising a complete casing adapted to be inserted in said camera compartment, a fixed gate-plate in said casing adjacent the front wall thereof, abutting means on said camera wall and said magazine front wall for limiting the forward movement of the magazine in the camera compartment toward the camera wall, an aperture plate carried by said front wall of the magazine casing provided with a picture framing and focusing aperture, said aperture plate providing a film guiding surface interiorly of said magazine at said aperture, said gate-plate being provided with an opening opposite said framing aperture and larger than said aperture, and a presser plate in said gate-plate opening for pressing the film against said aperture plate at said aperture, whereby the film is framed and guided by parts wholly carried by said unitary magazine to avoid improper movement of the film due to inaccurate fitting of the magazine in its compartment or undue pressure of the magazine toward the front wall of the camera.

2. Apparatus as set forth in claim 1 further characterized by the fact that said aperture plate is offset inwardly of the magazine from the forward portion of the front wall thereof.

3. Apparatus as set forth in claim 1 further characterized by the fact that said gate-plate is formed as a separate member mounted for independent movement on said front wall in cooperation with locating means carried by the front wall of the camera, and that said abutting means comprises other cooperating means on the front wall of the magazine and camera respectively.

4. A self-contained unitary film magazine adapted to be introduced into the magazine compartment of a motion picture camera, comprising bottom, top and side walls forming a completely enclosed casing, film supply and take-up spools mounted in said magazine, a gate-plate provided with a presser-plate opening mounted in said magazine in a fixed position relative to the front side wall of the casing, a film presser plate mounted in the opening of said gate-plate, positioning means on said magazine adapted to cooperate with parts in said camera for limiting the forward movement of the magazine, and a shiftable plate mounted on the front wall of said casing providing a picture framing and focusing aperture for the film, said aperture plate being adapted to be positioned by engagement with parts carried by the camera but independently of said magazine positioning means, and the aperture plate forming with said presser plate a film guiding passage disposed wholly within the magazine, whereby the film is permitted to have free movement past said framing aperture regardless of the fit or pressure of the magazine in the camera.

5. Apparatus as set forth in claim 4 further characterized by the fact that said shiftable aperture plate is mounted for loose movement upon retaining members carried by the front wall of the casing.

6. A motion picture film magazine as set forth in claim 4 further characterized by the fact that said aperture plate is mounted on cooperating feet and retaining members for free movement from and toward said front wall of the casing except for the action thereon of the presser plate and the cooperating part of the camera.

7. A motion picture film magazine as set forth in claim 4 further characterized by the fact that said aperture plate is mounted on retaining studs for free movement from and toward the front wall of the casing except for the action thereon of the presser plate and the cooperating part of the camera.

ALBERT KINDELMANN.